(12) United States Patent
Postic et al.

(10) Patent No.: US 8,843,289 B2
(45) Date of Patent: Sep. 23, 2014

(54) HYDRAULIC CLUTCH AND METHOD FOR DETERMINING AN ADAPTIVE CLUTCH FILL VOLUME OF THE HYDRAULIC CLUTCH

(75) Inventors: Morgan Postic, Osthouse (FR); Marc Rambert, Strasbourg (FR); Eric Dalais, Strasbourg (FR); Emmanuel Hoff, Plobsheim (FR); Nathaniel Wilke, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 331 days.

(21) Appl. No.: 13/177,900

(22) Filed: Jul. 7, 2011

(65) Prior Publication Data

US 2012/0067690 A1    Mar. 22, 2012

(30) Foreign Application Priority Data

Jul. 8, 2010 (GB) .................................. 1011510.3

(51) Int. Cl.
*G06F 7/00* (2006.01)
*F16D 48/06* (2006.01)

(52) U.S. Cl.
CPC ...... *F16D 48/066* (2013.01); *F16D 2500/1026* (2013.01); *F16D 2500/30818* (2013.01); *F16D 2500/5018* (2013.01)
USPC .............................................. 701/68; 477/5

(58) Field of Classification Search
USPC .......................................... 701/68; 477/5, 45
See application file for complete search history.

(56) References Cited

U.S. PATENT DOCUMENTS

| | | | |
|---|---|---|---|
| 6,039,674 A | 3/2000 | Dourra et al. | |
| 2009/0105039 A1 | 4/2009 | Sah et al. | |
| 2009/0111642 A1* | 4/2009 | Sah et al. | 477/5 |
| 2009/0111643 A1 | 4/2009 | Sah et al. | |
| 2009/0281700 A1* | 11/2009 | Petzold et al. | 701/68 |
| 2010/0057318 A1 | 3/2010 | Nedachi et al. | |

FOREIGN PATENT DOCUMENTS

| | | |
|---|---|---|
| EP | 2053262 A1 | 4/2009 |
| EP | 2159440 A1 | 3/2010 |
| JP | 2003343604 A | 12/2003 |

OTHER PUBLICATIONS

British Patent Office, British Search Report for Application No. 1011510.3, dated Oct. 7, 2010.

* cited by examiner

*Primary Examiner* — Thomas G Black
*Assistant Examiner* — Luke Huynh
(74) *Attorney, Agent, or Firm* — Ingrassia Fisher & Lorenz, P.C.

(57) ABSTRACT

At least a method is provided learning a characteristic filling volume of a hydraulic clutch. The method includes, but is not limited to applying a pressure pulse to the hydraulic clutch when the clutch is in a disengaged state and determining an inflection event at an input or at an output of a torque path in which the hydraulic clutch is situated. A characteristic filling volume of the hydraulic clutch is derived from the determined inflection event. Furthermore, a method is provided for learning a characteristic return spring pressure of the hydraulic clutch, for engaging the hydraulic clutch and corresponding devices for carrying out these methods.

19 Claims, 15 Drawing Sheets

| | C1 | C2 | C3 | C4 | C5 |
|---|---|---|---|---|---|
| | C1234 | C456 | C35R | CB26 | CBLR |
| | VBS D | VBS B | VBS A | VBS C | VBS B |
| R | x | | x | | x |
| 1FW | x | | Air purge | | |
| 1LCK | x | | Air purge | | x |
| 2 | x | | x | x | |
| 3 | x | x | | x | |
| 4 | | x | x | | |
| 5 | | x | | | |
| 6 | | x | | x | |

Possible clutch pulse
x Clutch use in the gear
Not possible or Not appropriate

HYDRAULIC CLUTCH AND METHOD FOR DETERMINING AN ADAPTIVE CLUTCH FILL VOLUME OF THE HYDRAULIC CLUTCH

CROSS-REFERENCE TO RELATED APPLICATION

This application claims priority to British Patent Application No. 1011510.3, filed Jul. 8, 2010, which is incorporated herein by reference in its entirety.

TECHNICAL FIELD

The technical field relates to a hydraulic clutch and a method for determining an adaptive clutch fill volume of the hydraulic clutch.

BACKGROUND

A hydraulic clutch comprises hydraulically actuated friction elements The friction elements generally include a housing, a piston and a clutch apply cavity defined between the housing and one side of the piston. The hydraulic clutch can also include a plurality of alternating metal plates and friction material disks on another side of the piston. Hydraulic oil is pumped into and out of the cavity for causing engagements and disengagements of the hydraulic clutch. In a vehicle power train, a hydraulic clutch may be positioned between a crankshaft and a gearbox for transmitting driving torques from the crankshaft to the gearbox. In the case of an automatic transmission, the gearbox itself may also include hydraulic clutches for actuating the gearwheels and, therefore, for changing gear.

For example, US 2009/0105039 A1 discloses a method of operating a powertrain that includes an automatic transmission, an internal combustion engine and an electric machine. The method includes a step of monitoring fluid pressure of a hydraulic clutch by using a pressure control switch. The pressure control switch is connected to a transmission control module for calculating a flow rate and a clutch volume in response to the fluid pressure. Operations of the hydraulic clutch are controlled based upon the clutch fill volume. However, the disclosed method involves expensive components and complicated techniques for its implementation.

SUMMARY

The present application provides methods and means for deriving a characteristic fill volume of a hydraulic clutch, for deriving a characteristic return spring pressure of the hydraulic clutch and for actuating a hydraulic clutch actuator of the hydraulic clutch, based on the characteristic volume and the characteristic return spring pressure.

In particular, the methods and means can be applied advantageously to hydraulic clutches of a planetary gearbox for an automatic transmission. The learning of the fill volume and of the return pressure is achieved by applying pressure pulses to a hydraulic clutch which is not currently engaged and which is essentially empty and by observing inflection events at a torque input or at a torque output of a torque path that comprises the hydraulic clutch. The torque path may comprise, for example, a planetary gearbox, a turbine of a torque converter at the torque input of the planetary gearbox and an output shaft at the torque output of the planetary gearbox.

The application discloses a method for learning a characteristic filling volume of a hydraulic clutch, the method comprises iterative steps of applying a pressure pulse to the hydraulic clutch when the clutch is in a disengaged state and determining an inflection event, especially an acceleration of an input shaft or an output shaft at an input or at an output of a torque path which comprises the hydraulic clutch. A characteristic filling volume is derived from the determined inflection event and is stored in a computer readable memory for later use.

In the case of an automatic gearbox, the inflection event can be detected at a torque converter of the automatic gearbox, especially at a turbine shaft of the torque converter. It can also be detected at an output shaft of the gearbox. It is advantageous to use an existing velocity or acceleration sensor as inflection sensor. For some automatic gearboxes, such an acceleration sensor is provided at the turbine.

The application furthermore discloses a method for learning a characteristic return spring pressure, or, respectively, a return spring force of a hydraulic clutch. The method comprises iterative steps of applying that are performed when the clutch is in a disengaged state. The iterative steps comprise applying a first, a second and a third pressure pulse to the hydraulic clutch. The pressure level of the second pressure pulse is smaller than the pressure level of the first pressure pulse and the pressure level of the third pressure pulse is smaller than the pressure level of the first pressure pulse and greater than the pressure level of the second pressure pulse.

While or after the third pressure pulse is applied, an inflection event, especially an acceleration of an input or output shaft, is determined at an input or at an output of a torque path which comprises the hydraulic clutch. The characteristic spring return pressure of the hydraulic clutch is derived from the determined inflection event and the characteristic spring return pressure is stored in a computer readable memory for later use. Preferentially, the height and duration of the first pulse is such that the clutch is close to an engagement after application of the first pulse and the height of the second pressure pulse is approximately at an estimated return spring pressure or slightly below.

More specifically, it is disclosed that the step of determining an inflection event comprises a detection whether the hydraulic clutch changes from the disengaged state to an at least partially engaged state.

The torque path may comprise one or more other clutches, which are engaged. In this case, the engagement of the hydraulic clutch leads to a tie-up situation which can be detected easily.

More specifically, it is disclosed that the hydraulic clutch is essentially empty prior to applying the at least one pressure pulse. In this way, characteristic clutch values such as clutch volume and return spring pressure can be determined more accurately.

In particular, the application discloses a method according to the aforementioned which further comprises applying a fast cycle series of pressure pulses with increasing pulse length until the inflection event is detected. The fast cycle series can have a large increment to detect the clutch volume or, respectively, the clutch capacity fast.

In addition to the fast cycle series, the method may furthermore comprises a step of applying a slow cycle series of pressure pulses until the inflection event is detected. The slow cycle series comprises pulses with increasing pulse length and a pulse length increment of the slow cycle series is smaller than a pulse length increment of the fast cycle series. In this way, the clutch volume can be determined more accurate after a first estimate has been derived by the fast cycle series.

Furthermore, the method may comprise applying a test series of pressure pulses, the pressure pulses having essentially equal lengths and the pulse length being essentially equal to the length of the last pulse of the slow cycle series of pressure pulses. In this way, it can be checked whether the previously derived clutch volume is correct for more accurate determination. If no inflection event is observed during a maximum number of test cycle pulses, the slow cycle may be repeated but with a width of a first pulse which is greater than the width of the previous first pulse of the slow cycle. Especially, the first pulse of the repeated slow cycle can be made essentially equal to the length of the pulse of the test cycle.

The method for determining a characteristic return spring pressure of a hydraulic clutch may further more comprise the following steps. If an inflection event is detected in the determination step a return spring pressure is derived from the pressure level of the second pulse. If no inflection event is detected in the determination step the pressure level or, respectively the height of the second pressure pulse is increased and the pressure level of the third pressure pulse is increased as well. The second pulse is applied with the increased pressure level of the second pulse and the third pulse is applied with the increased pressure level of the third pulse. If an inflection event is determined, a characteristic return spring pressure is derived. The steps of applying the second and third pulse with increased pressure levels may be repeated until an inflection event is detected.

More specifically, the application discloses a method for determining a characteristic return spring pressure of the hydraulic clutch, wherein the width of the second pressure pulse is greater than the width of the first pressure pulse and the width of the second pressure pulse is greater than the width of the third pressure pulse.

The abovementioned methods to derive a characteristic clutch volume and a characteristic return spring pressure are not dependent on pressure measurements at the hydraulic clutch. The characteristic clutch volume and the characteristic return spring pressure can be used in a method for engaging the clutch which does not need pressure measurements at the hydraulic clutch. Therefore, pressure sensors at the hydraulic clutch can be dispensed of That in turn leads to significant improvements regarding cost reduction and serviceability and also to weight reduction and thus to fuel savings.

Methods according to the application for determining characteristic clutch values can also be used to compensate for wear and tear of a hydraulic clutch, to indicate a service interval and to indicate specific fault conditions.

More specifically, the application also discloses a method for engaging a hydraulic clutch which comprises the following steps. A characteristic clutch volume of the hydraulic clutch is read in from a computer readable memory. A characteristic return spring pressure of the hydraulic clutch is read in from a computer readable memory. For example, the characteristic volume and the characteristic return spring pressure are derived according to one of the abovementioned methods. A filling pressure for the hydraulic clutch is derived, based on the characteristic clutch volume, and the characteristic return spring pressure. A command pressure is derived from the filling pressure and the command pressure is applied to a servo valve of the hydraulic clutch, for example to a VBS (variable bleed solenoid) valve for engaging the hydraulic clutch.

The derivation of the filling pressure may furthermore comprise reading in a temperature signal from a temperature sensor in the hydraulic fluid and reading in a speed signal from a rotation speed sensor at the input or at the output of the torque path. An offset pressure is derived by reading out a lookup table based on the temperature signal and the speed signal and the offset pressure is added to the fill pressure to obtain an adapted fill pressure. From the adapted fill pressure, a command pressure is derived and the command pressure is applied to the servo valve of the hydraulic clutch.

Furthermore, the application also discloses a computer program product comprising a computer readable code for carrying out one of the aforementioned methods. The computer readable codes can be embedded in the non-volatile memory, an optical storage medium, or other computer readable/writable media, for example in a memory of a microcontroller. For example, the computer program product may be part of the content of an EPROM memory of a microcontroller. In a broader sense "Computer program product" also comprises the device which contains the computer readable code, such as the microcontroller.

Moreover, the application discloses a hydraulic clutch assembly which comprises at least one hydraulic clutch, a filling pipeline which is connected to the at least one hydraulic clutch for filling and a clutch fill regulator valve in the filling pipeline for dividing the filling pipeline into an upstream pipeline for receiving hydraulic fluid with a line pressure (Pline) and into a downstream pipeline for connecting the clutch fill regulator valve to the hydraulic clutch. The regulator valve is also referred to as a servo valve. The hydraulic clutch assembly is characterized in that it comprises a control unit. The control unit comprises an output port for an output control signal to the clutch fill regulator valve of the at least one hydraulic clutch and an input port for receiving an input signal from an inflection event sensor in a torque path which comprises the at least one hydraulic clutch. The control unit also comprises a processing unit for determining a characteristic clutch value, such as a clutch volume or a return spring pressure from the output control signal and from the input signal and for storing the characteristic clutch value.

More specifically, the application discloses a hydraulic clutch assembly, wherein the downstream pipeline further comprises a downstream orifice for acting with the clutch fill regulator valve to apply a clutch fill pressure ($\Delta$Pfill) to the hydraulic clutch.

The downstream orifice can divide the downstream pipeline into a regulator downstream pipeline and a clutch downstream pipeline such that an end of the clutch fill regulator valve is connected to the regulator downstream pipeline via a pressure P_valve which is the regulated pressure from a VBS signal. This arrangement allows for a reproducible relationship between command pressure and the clutch fill pressure. Thus, the accuracy of the volume and pressure learning methods is improved.

In the above, VBS refers to the type of servo valve or clutch regulator valve used, which is a variable bleed solenoid valve. The downstream orifice is useful for creating stable pressure inside the hydraulic clutch such that the clutch fill regulator valve can exert and regulate pressure pulses of the hydraulic fluid more accurately in a stable and consistent manner.

The upstream pipeline can comprise an upstream orifice for controlling fluid pressure received by the clutch fill regulator valve. The upstream orifice and downstream orifice act together to keep the regulator valve fully-filled throughout its operations and for providing precise pressure pulses.

Moreover, the application discloses also a gearbox assembly which comprises a planetary gearbox with hydraulic clutches, wherein at least one of the hydraulic clutches is a part of a hydraulic clutch assembly. It is possible to control only part of the clutches with control methods according to the present application and to control the rest of the hydraulic clutches with an existing method.

The application further provides a powertrain for a motor vehicle that comprises the hydraulic clutch assembly and a transmission control unit connected to both the clutch fill regulator valve and the hydraulic clutch, for adapting clutch fill volumes. The transmission control unit can be programmed to control the regulator valve and the hydraulic clutch automatically such that a driver of the vehicle is relieved from tedious operations of the hydraulic clutch. Thus, the driver is able to relax and enjoy more on the comfort of driving.

According to an embodiment, the fill volume is determined during steady motion state of the vehicle. Thus, the method is not influenced by inputs from clutch interactions or inputs that can change the speed of a turbine shaft or an output shaft during a shift. For example, a clutch torque capacity interaction could lead to a false detection of capacity events. Thus, a better accuracy of the method can be achieved.

In an embodiment, the determination of the fluid pressure command comprises the steps of applying pressure pulses of incremental duration to an unused clutch, and detecting if an inflection event is in excess of a given calibration detection threshold. The term "unused clutch" here refers to a clutch that is not used to hold the current gear ratio. This is generally also a state in which the clutch apply cavity is essentially empty from hydraulic fluid.

Thus, a series of pressure pulses is applied to an idle clutch that is not used to hold the current gear ratio, wherein the duration of the pressure pulses increases with a subsequent pulse, until the fill pressure reaches a desired level. When the pulse duration is long enough to completely fill the cavity during one pulse, a three-clutch tie-up is caused which can be easily detected. In the tie-up the driving torque prevented from being transferred through the automatic transmission. Such a tie-up is acceptable since, according to the application, the tie-up is being made mild enough that the driver is not affected but, on the other hand, big enough such that it can be detected.

At an onset of filling the idle hydraulic clutch, the clutch is not engaged. An inflection event is not detected at the onset. As the hydraulic clutch continues to be filled, the inflection event is detected. If an acceleration of the output shaft of the third clutch is in excess of a calibration detection threshold, it is an indication that the applied pressure and the associated fill time are enough to fill the clutch cavity. Hence, the adaptation method is based on a unique event directly following a pressure application to the empty clutch, specifically for the purpose of producing an adapted detection event. Thus, the clutch fill volume can be learned accurately, rather than making incremental adjustments based on events observed during a change in the gear ratio that could be related to inputs other than a fill time or a fluid pressure command.

The inflection event can be a brief change in output shaft or turbine shaft acceleration. Thus an acceleration inflection is used as an indicator that the applied pressure is enough to fill the unused clutch apply cavity. An output shaft or turbine shaft acceleration event and, therefore, the three clutch tie-ups are large enough to make an accurate event detection possible. On the other hand, the three clutch tie-ups are mild enough such that the driver can not detect them, for example by a disturbance in the velocity.

According to an embodiment, the applied pressure is recorded when an inflection event is at least once observed in excess of the calibration threshold value, to indicate a fluid pressure command.

A detected capacity, responsive to an applied pressure that is large enough to fill the clutch apply cavity when a series of pressure pulses is applied to the clutch during given operating conditions is recorded. Thus, the pressure that applies to the clutch at given pressure and temperature conditions is recorded and, therefore, that value can be used for the calculation of, for example, a fill time for any shift where that clutch is the oncoming hydraulic element, instead of learning a unique volume for each shift. Therefore, a fluid pressure command can be recorded, that is determined without use of signals and values indicating the position of the pressure switches.

According to another embodiment, the reactive spring pressure can be determined by applying a clutch pressure profile to the unused clutch, wherein the pressure profile includes slightly under filling the clutch and then holding the clutch at a pressure plateau, and applying a test pulse pressure to the clutch, which increases slightly above the plateau. If an inflection event is observed in excess of the calibration detection threshold value, the pressure plateau level indicates the reactive spring pressure, or the plateau level will be increased.

The term "unused clutch" again refers to a clutch that is not used to hold the current gear ratio and, therefore, to a clutch wherein the clutch apply cavity does not contain any hydraulic fluid and is considered empty.

Thus, the return spring pressure can be determined in a similar fashion to the pressure command and is close loop controlled. Therefore, the clutch fill volume can be learned accurately, rather than making incremental adjustments based on events observed during a change in the gear ratio that could be related to inputs other than a fill time or a pressure command. Therein, the pressure plateau level and the test pulses increase incrementally in pressure until an inflection event, such as an output or turbine shaft acceleration is observed in excess of the calibration threshold value during the time the responsive test pulse is applied to the clutch. Once the pressure has been incremented such that an inflection event is observed in excess of the calibration threshold value, the clutch is considered completely filled for torque transmission. Therefore, the responsive pressure plateau indicates the reactive return spring pressure.

In an embodiment, the reactive return spring pressure is determined after the fluid pressure command is determined. Thus, the actual determined fill time is used to size the pulse applied to the unused clutch. Hence, with the method of the present application, a unit-to-unit variation of the clutch fill volume can be determined, without an event detection of the pressure switches. Therefore, the accuracy of operating the hydraulic clutch according to the method is further enhanced.

The flow rate can be calculated from the difference between the fluid pressure command and the reactive return spring pressure. Generally, pressure switches indicate when the clutch regulating valve is in a full-feed position and when the feedback of the clutch pressure on the side of the valve spring of the regulator valve pushes the valve to a regulating position after the clutch is filled. Therefore, it is possible to replace signals and values indicating the position of the regulator valve dependent on an event detection of the pressure switches, by understanding and calculating the difference between the fluid pressure command and the reactive pressure of the return spring, without a loss of accuracy within the calculation of the clutch fill volume.

In an embodiment, the calculated clutch fill volume is weighted by a previous pulse cycle clutch fill volume and assigned to an adaptive non-volatile RAM variable used for the clutch volume during a fill phase of a shift. Thus, the clutch volume is weighted in accordance with the previous value of the clutch fill volume and, therefore, compared to the previous value of the clutch fill volume. Herein, the previous pulse cycle clutch fill volume refers to the clutch fill volume calculated within the previous adaptation. Hence, there is a sub-routine for isolating outlier, for example when the difference between the calculated clutch fill volume and the previous pulse adapted clutch fill volume is in excess of a predetermined percentage of the previous pulse adapted clutch fill volume. Therefore, a better accuracy of the current method can be achieved. Without the weighting factors, some of the calculated clutch fill volume values will be correctly identified, and some of the calculated values will be incorrectly identified.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background or summary or the following detailed description In the following description, details are provided to describe the embodiment. It shall be apparent to one skilled in the art that the embodiment may be practised without such details. FIGS. 1-15 comprise parts with a same reference number. Description of these parts is hereby incorporated by reference.

Figure 1:
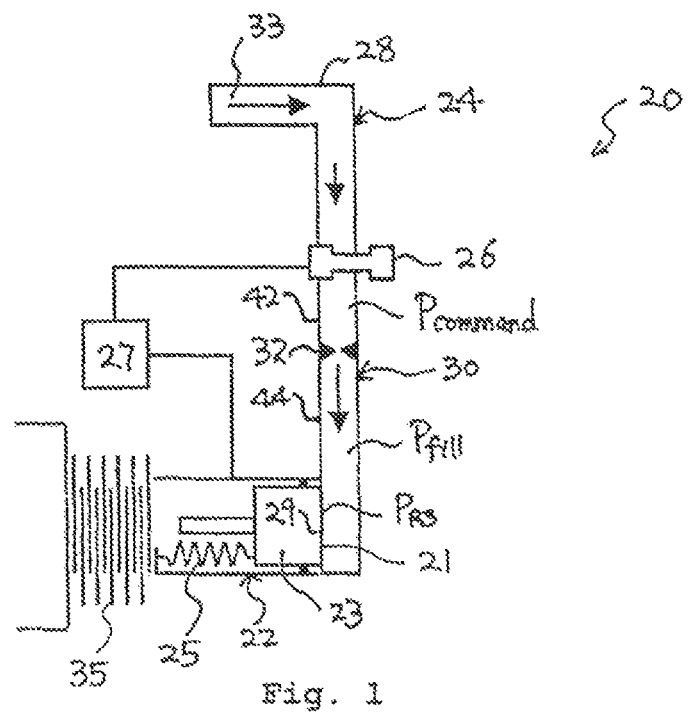
FIG. 1 illustrates a hydraulic clutch that is connected to its filling pipeline.

FIG. 1 illustrates a hydraulic clutch assembly 20 that comprises a hydraulic clutch 22, a filling pipeline 24 and a clutch fill regulator valve 26. The hydraulic clutch 22 is connected to a first end 21 of the filling pipeline 24, whilst the filling pipeline 24 is filled with a hydraulic oil 33. The regulator valve 26 divides the filling pipeline 24 into an upstream pipeline 28 and a downstream pipeline 30. In other words, the upstream pipeline 28 and the downstream pipeline 30 are joined together via the regulator valve 26. The downstream pipeline 30 further connects the regulator valve 26 to the hydraulic clutch 22.

The hydraulic clutch 22 comprises a piston 23, a return spring 25 and two arrays of rotary friction elements 35. A first end 29 of the piston is joined to the first end 21 of the filling pipeline 24 such that the piston 23 can be displaced to push the two arrays of rotary friction elements 35 together for torque transmission. A second end 31 of the piston 23 is joined to the return spring 25 such that the first end 29 of the piston 23 is pushed against the first end 21 of the downstream pipeline by spring force. Hence, the piston 23 applies a return spring pressure PRS to the hydraulic oil 33.

In the downstream pipeline 30, a sharp edged orifice 32 is mounted in a middle position of the downstream pipeline 30 for restricting hydraulic oil 33 flowing in the filling pipeline 24. The hydraulic oil 33 is also known as a hydraulic fluid that is received at the upstream pipeline 24. This orifice is known as a downstream orifice 32 which divides the downstream pipeline 30 into a regulator downstream pipeline 42 and a clutch downstream pipeline 44. The regulator downstream pipeline 42 is provided between the regulator valve 26 and the downstream orifice 32, whilst the clutch downstream pipeline 44 is provided between the clutch 22 and the downstream orifice 32.

Arrows of FIG. 1 depict an injection flow path of the hydraulic oil 33 for actuating the hydraulic clutch 22. The hydraulic oil 33 flows from the upstream pipeline 28, via the regulator valve 26, via the downstream pipeline 30 to the hydraulic clutch 22. The upstream pipeline 28 is under an upstream line pressure Pline. Between the regulator valve 26 and the downstream orifice 32, the downstream pipeline 30 has a downstream line pressure Pcommand. The downstream line pressure Pcommand determines flow rates of the hydraulic oil 33 that passes through the pipeline 24. Between the downstream orifice 32 and the hydraulic clutch 22, the downstream pipeline 30 has a reactive spring pressure PRS, which is related to the fluid pressure in the hydraulic clutch 22. Both the regulator valve 26 and the hydraulic clutch 22 are connected to a transmission control unit 27 for controlling. The transmission control unit 27 comprises a data processor and a non-volatile memory (NVM) that are connected together for operation.

Figure 2:
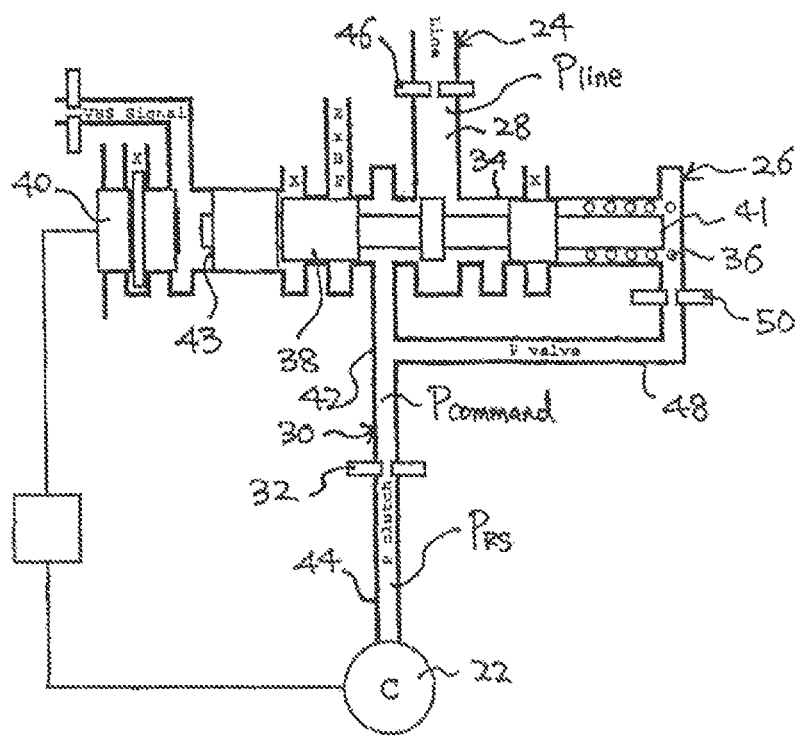
FIG. 2 illustrates the hydraulic clutch and the filling pipeline of a hydraulic clutch assembly.

FIG. 2 illustrates the hydraulic clutch 22 and the filling pipeline 24 of the hydraulic clutch assembly 20. The regulator valve 26 comprises a housing 34, a valve spring 36, a core shaft 38 and a plug and retainer 40. The housing 34 has ports connected to the upstream pipeline 28, the downstream pipeline 30 and other related hydraulic pipelines. The core shaft 38 has a number of cylinders with various diameters that are coaxially connected and closely enclosed by the housing 34. A first end 41 of the core shaft 38 is pushed against the valve spring 36, whilst a second end 43 of the core shaft 38 faces the plug and retainer 40.

At an upstream side, the housing 34 has a port connected to the upstream pipeline 28 and another port connected to the downstream pipeline 30. An upstream orifice 46, which is similar to the downstream orifice 32 is installed in the upstream pipeline 28. At a downstream side, the first end 41 of the regulator valve 26 is connected to the regulator downstream pipeline 42 via a P valve pipeline 48. The P valve pipeline 48 has a P valve pipeline orifice 50 in the middle.

Referring to both FIG. 1 and FIG. 2, the filling pipeline 24 provides a conduit for conveying the hydraulic oil 33 to the clutch 22. Correspondingly, the regulator valve 26 is used for controlling the flow rate and pressure of the hydraulic oil 33 inside the pipeline 24 by opening, closing, or partially obstructing its passageway. A coil of the plug and retainer 40 can be electrically charged or discharged in order to move the core shaft 38 in its longitudinal axis direction of the core shaft 38 for regulating the hydraulic oil 33 flowing in these hydraulic pipelines.

Figure 3:
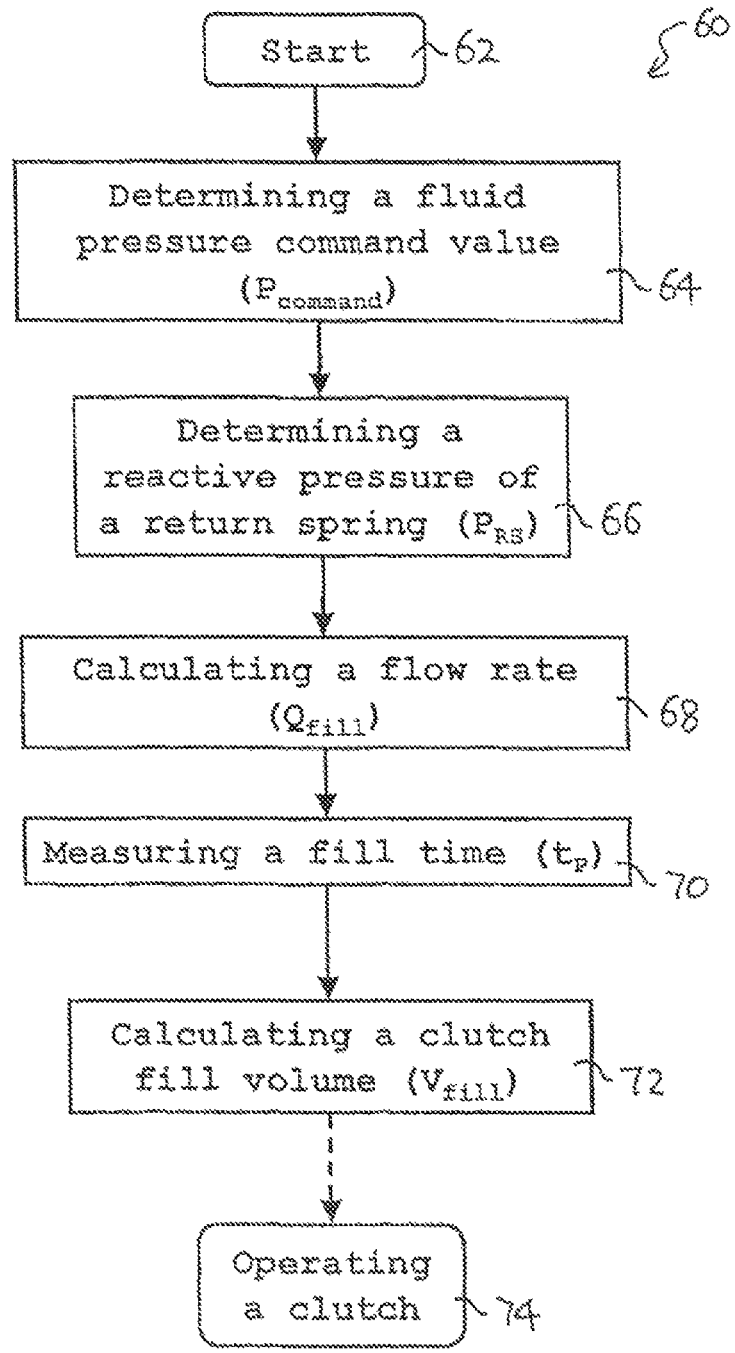
FIG. 3 illustrates a first flow chart on a method for operating the hydraulic clutch based on fill volume adaptation.

FIG. 3 illustrates a first flow chart on a method 60 for operating the hydraulic clutch 22 based on fill volume adaptation. The flow diagram outlines a series of six sequentially related steps 62, 64, 66, 68, 70, 72 together with an optional step 74 for operating the hydraulic clutch 22. The transmission control unit 27, which is connected to the hydraulic clutch 22, the hydraulic clutch 22 and other components of an automatic transmission, is programmed to carry out the method 60 automatically.

The method 60 starts with a first step 62 of pumping the hydraulic oil 33 into the filling pipeline 24. The downstream line pressure Pcommand, which represents the fluid pressure value of the hydraulic oil 33 at the regulator downstream pipeline 42, is determined in a second step 64. The reactive spring pressure PRS of the return spring 25 is determined at a third step 66. In a fourth step 68, the transmission control unit 27 calculates a flow rate Qfill of the hydraulic oil 33 for filling the hydraulic clutch 22. The transmission control unit 27 also measures a fill time Tp in a fifth step 70. Using the flow rate Qfill and the fill time Tp (i.e. tp), the transmission control unit 27 calculates a clutch volume Vfill in a sixth step 72. The method has an optional seventh step 74 in which the hydraulic clutch can be actuated for engagement or disengagement.

In the above-described method 60, the step 64 of determining a fluid pressure command value Pcommand and the step 66 of determining a reactive pressure PRS of a return spring 25 can be performed in any order. Also, the step 68 of calculating the flow rate Qfill and the step 70 of measuring a fill time can also be performed in a reverse order.

Figure 4:
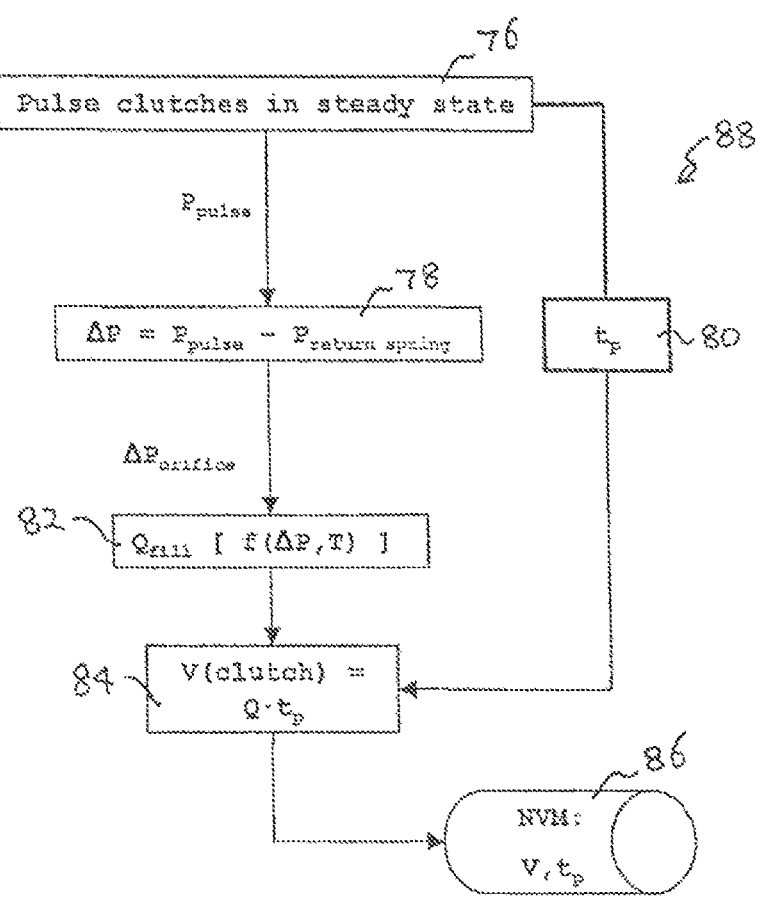
FIG. 4 illustrates a second flow chart on a method of a first iteration of the fill volume adaptation.

FIG. 4 illustrates a second flow chart on a method 88 of a first iteration of the fill volume adaptation, which corresponds to the method 60 of FIG. 3. In a steady state, the hydraulic oil 33 is pulsed 76 into the hydraulic clutch 22 under pressure Ppulse according to a predetermined manner. The steady state or a steady motion state is defined as a cruising vehicle at constant speed without gear shifting of the automatic transmission. The Ppulse is alternatively known as Pcommand. Since both the return spring pressure PRS and the incoming hydraulic oil pressure Ppulse are determined, the transmission control unit 27 can calculate 78 a fluid pressure ΔPorifice at the hydraulic clutch 22 by subtracting the PRS from the Ppulse. In the mean time, the transmission control unit 27 examines 80 a duration taken from a start of pulsing the hydraulic oil 33 to a complete filling of the hydraulic clutch 22. By doing so, the transmission control unit 27 is able to compute 82 the flow rate Qfill, which further takes the temperature T of the hydraulic oil 33 into account. Accordingly, the clutch fill volume Vfill (i.e., Vclutch or V) can be determined 84 by multiplying the flow rate Qfill with the fill time tp. The transmission control unit 27 stores 86 values of Vfill and Tp into the non-volatile memory after the first iteration of the method 88 according to FIG. 4. Details on how Ppulse is applied are explained later.

The control unit comprises a predetermined value of the return spring pressure PRS in its memory, which is set, for example, as a factory setting or during a servicing of the vehicle. The preset value can be used to initialize the return pressure learning process or when no valid learned value of PRS is available.

Figure 5:
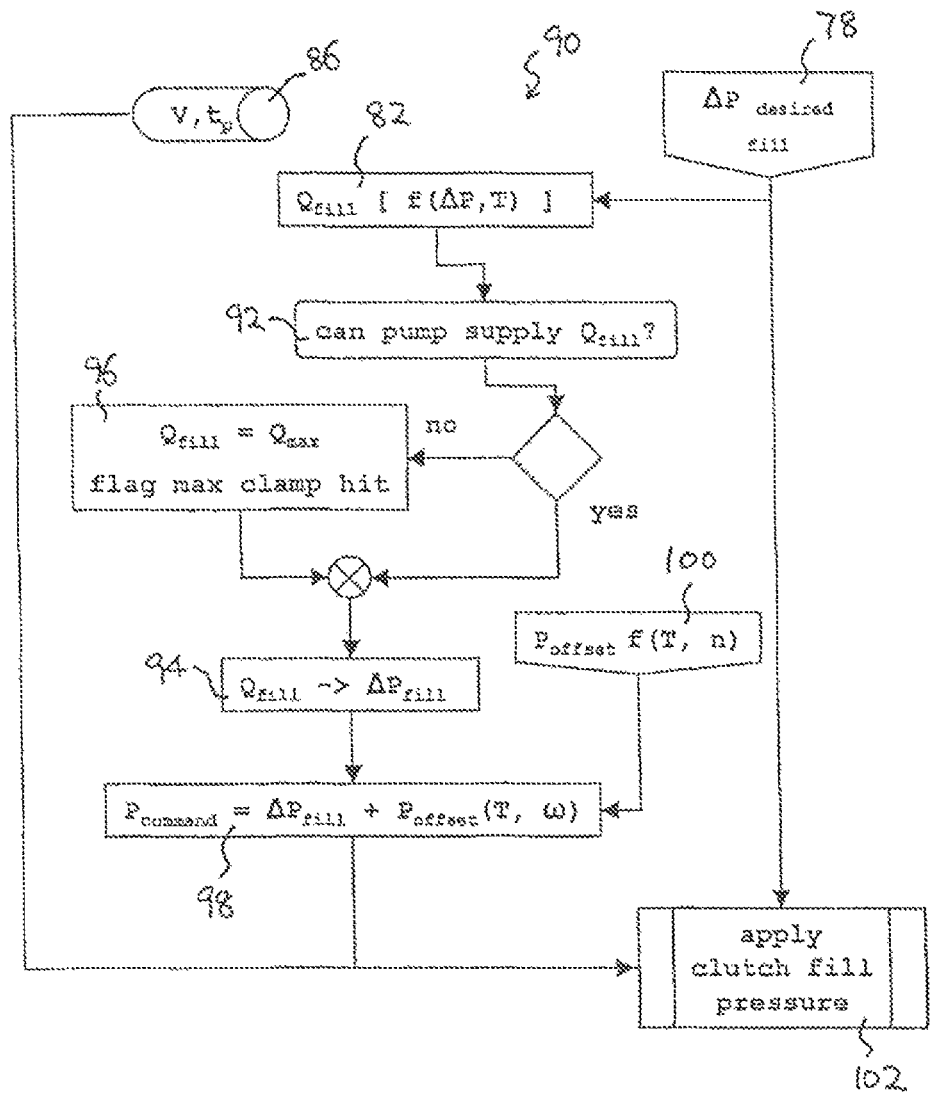
FIG. 5 illustrates a third flow chart on a method of a second iteration for the fill volume adaptation.

FIG. 5 illustrates a third flow chart on a method 90 of a second iteration for the fill volume adaptation. The second iteration is performed based on the stored values Vfill and tp of the first iteration of FIG. 4. The second iteration 90 is based on the fluid pressure ΔPorifice at the hydraulic clutch 22.

According to FIG. 5, the transmission control unit 27 checks in a first step 92 whether a pump supplies the amount of hydraulic oil 33 at a flow rate Qfill that equals a predetermined value Qmax. If the pump has supplied a sufficient amount of hydraulic oil 33, the transmission control unit 27 proceeds to a third step 94 in which the transmission control unit 27 further finds a fill pressure ΔPfill based on the Qfill. The clutch fill pressure ΔPfill is determined by subtracting PRS from Pcommand.

If the pump has not supplied a sufficient amount of hydraulic oil 33, the transmission control unit 27 will cause the pump to inject more hydraulic oil 33 into the hydraulic clutch 22 until a flag of maximum clamp is reached (i.e., Qfill=Qmax). Subsequently, the transmission control unit 27 proceeds to the third step 94.

The transmission control unit 27 in a fourth step causes the pump to supply the hydraulic oil 33 at an adapted fluid pressure command value P'command, which is an adapted clutch fill pressure at the regulator downstream pipeline 42. The adapted fluid pressure command value P'command is obtained by compensating the fill pressure ΔPfill with an offset pressure value Poffset in a fourth step 98. The Poffset value depends on temperature of the hydraulic oil 33 and the rotary speed ω of the pump. The dependence Poffset (T, ω) may be taken from a stored lookup table which is stored as factory setting and/or updated during a calibration. In a sixth step 102, the transmission control unit 27 applies the adapted fluid pressure command value P'command to the hydraulic clutch 22 for clutching. In other words, the adapted fluid pressure command value P'command is obtained by weighting the previous fluid fill pressure value Pcommand.

Figure 6:
FIG. 6 illustrates a table on relationships of clutches to learn volume versus corresponding gear speeds.

FIG. 6 illustrates a table on the suitability of five clutches of a planetary gearbox to apply volume and/or pressure learning according to the application to those clutches. The column headings indicate for which gears a clutch is used and from which variable bleed solenoid valve the clutch is actuated. The row headings indicate the gear.

For the specific planetary gearbox to which the table of FIG. 6 applies, a clutch pulse method to learn volume and or pressure is suitable for the first clutch C1 when the fifth or sixth gear is engaged, for the second clutch C2 when the third gear is engaged, for the third clutch C3 when the fourth or the sixth gear is engaged and for the fourth clutch C4 when the third, fourth or fifth gear is engaged.

In particular, clutch pulsing is not suitable when the clutch is not idle, for example when the clutch is engaged or when it is being purged. Also, the lower gears 1, 2 and the reverse gear R are less suitable for clutch pulsing according to the application because a steady state cruising over a longer period of time is unlikely for those gears. For the fifth clutch C5 a clutch pulsing would be feasible but is not necessary. The fifth clutch is only used for the lock position 1LCK and for the reverse gear R.

Figure 7:
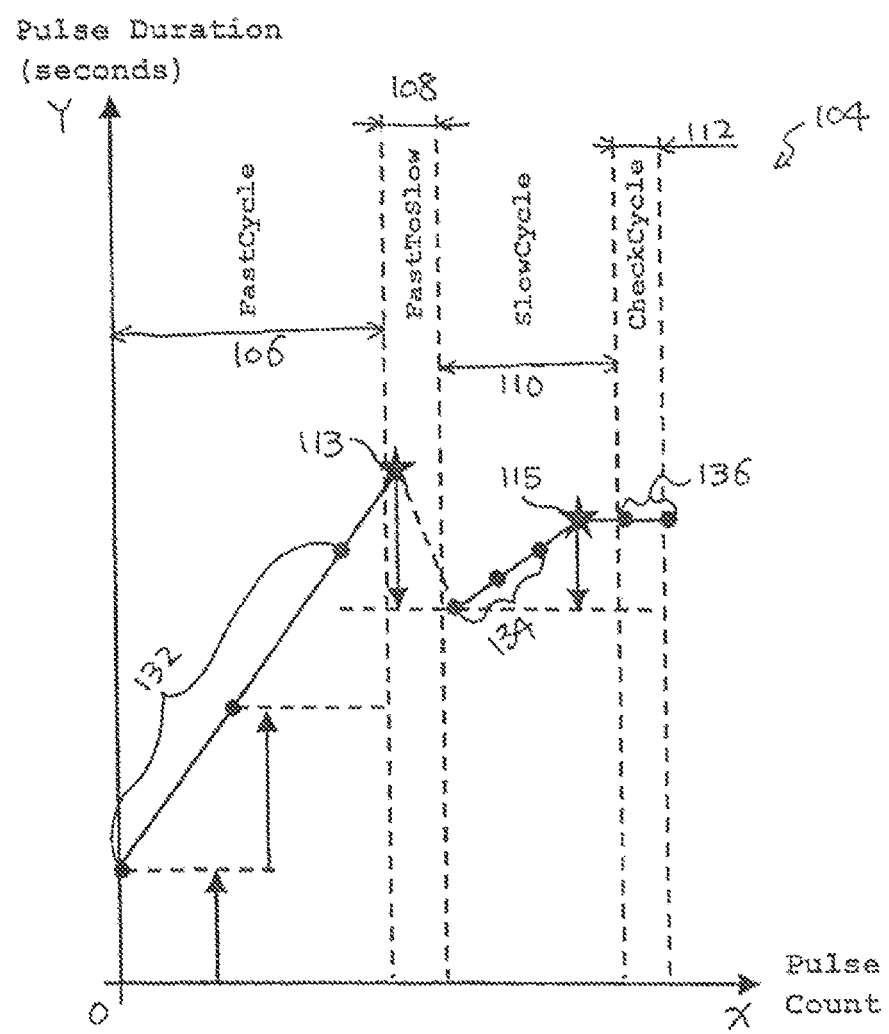
FIG. 7 illustrates a method for determining an adaptive clutch fill volume of the hydraulic clutch by using pulse pumping.

FIG. 7 illustrates a method 104 in a chart form for determining an adaptive clutch fill volume Vfill of the hydraulic clutch 22 by using pulse pumping. The method 104 provides further details of the previously described methods 60, 88, 90 for describing the volume learn pulse strategy.

FIG. 7 presents a two dimensional Cartesian coordinate system. Its X-axis denotes pulse counts and, therefore, indicates a number of pressure pulses applied to the hydraulic clutch 22. Further, its Y-axis denotes pulse duration characterised by seconds. Dots in the chart represents each pulse of the pressure pumping during the entire volume learn pulse process 104. A zigzag that joins the dots shows a path how the volume learn pulse process 104 is completed. The entire process 104 is divided into four cycles, which consists of a fast cycle 106, a fast-to-slow cycle 108, a slow cycle 110 and a check cycle 112 sequentially. In particular, a first fluid fill capacity detection point 113 exists in the fast-to-slow cycle 108, whilst a second fluid fill capacity detection point 115 exists in the slow cycle 110. FIG. 7 is better understood by relating to FIG. 8.

Figure 8:
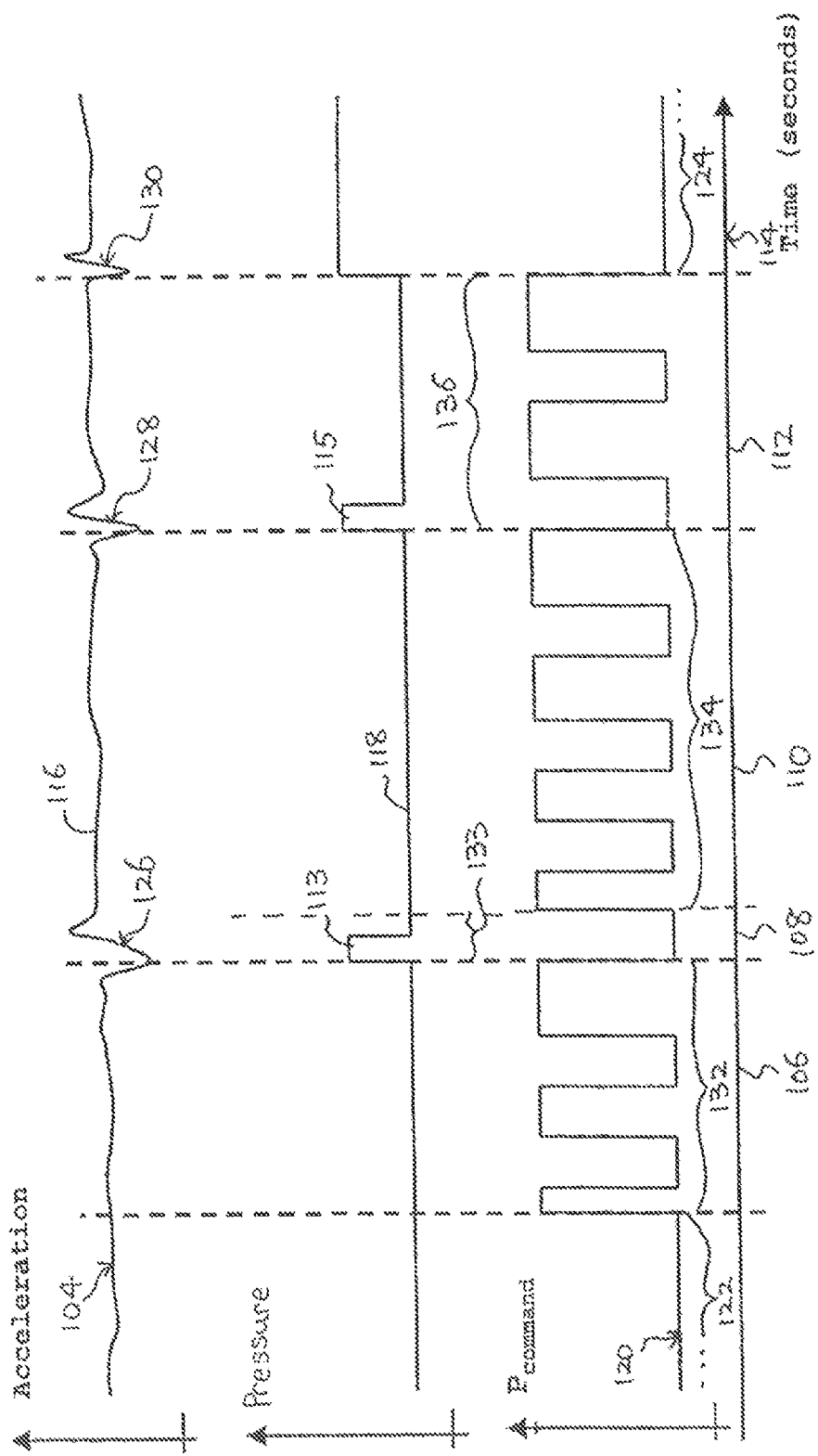
FIG. 8 illustrates a volume learn pulse strategy corresponding to the method of FIG. 7.

FIG. 8 illustrates a chart showing how pulsating pumping affects driving torque transmission and volume fill capacity. In the chart, a lateral axis 114 denotes the period T characterised by seconds. FIG. 8 shows three strings 116, 118, 120 that extend laterally. The three strings 116, 118, 120 denote, from top to bottom, acceleration values 116 of the output shaft of the hydraulic clutch, fluid fill volume detections 118 and pumping pulses 120 of hydraulic fluid fills. The fluid fill volume detections 118 are related to fluid pressure fill command value Pcommand or Ppulse. The three strings 116, 118, 120 present events that occur over the timeline T.

The third string 120 is divided into five consecutive segments of cycles of fluid pumping, which consist of an initiation cycle or initiation period 122, a fast cycle 106, the fast-to-slow cycle 108, the slow cycle 110, the check-cycle 112 and an adapted cycle or adapted period 124.

A starting time "fast init" of the fast cycle 106 at the end of the initiation period 122 is based on a determination of a steady state condition. The steady state condition is determined by conditions such as absence of throttle changes, constant torque, stable road conditions. The road conditions may be inferred from measurements of acceleration sensors, for example.

During the fast cycle 106, the pump propels the hydraulic oil 33 into the empty hydraulic clutch 22. Internal fluid pressure of the hydraulic clutch 22 is not yet built up. In the fast cycle 106, the regulator valve 26 provides three pulses of hydraulic oil 33 for filling. The three pulses correspond to three dots in the fast cycle 106 of FIG. 7. In the fast-to-slow cycle 108, the regulator valve 26 offers one pulse of hydraulic oil 33 for filling, which also corresponds to one dot in the slow to fast cycle 108 of FIG. 7. In the slow cycle 110, the regulator valve 26 again provides three pulses of hydraulic oil 33 for filling and they correspond to three dots in the slow cycle 110 of FIG. 7. In the check cycle 112, the regulator valve 26 exerts two pulses of hydraulic oil filling, and the two pulses correspond to the two dots in the check cycle 112 of FIG. 7.

The second string 118 indicates two fluid pressure command values Pcommand at the two detection points 113, 115 of approximately the same magnitude. A first capacity detection flag 113 is raised at an end of the fast cycle 106, once an input or output acceleration threshold is exceeded. A slow cycle detection flag 115 is raised at an end of the slow cycle 110, once an input or output acceleration threshold is exceeded. According to the present application, a measurement of the pressure command values Pcommand corresponding to the capacity detection flags 113, 115 by inline pressure sensors is not required. Instead, the required pressure values Pcommand are detected by measuring an acceleration of the output shaft of the hydraulic clutch 22 or by measuring an acceleration of a turbine shaft of the hydraulic clutch 22.

The first string 116 plots speeds of the output shaft of the hydraulic clutch 22. A rotary speed sensor on the output shaft sends signals to the transmission control unit 27 for plotting the speeds of the output shaft. Changes of the speeds are noted as inflection events. The inflection events occur when the required fluid pressure command values Pcommand are reached. In particular, a first inflection event 126 arises at an end of the fast cycle 106 when filling of the hydraulic oil affects rotary speed of the output shaft at the steady state.

A second inflection event 128 takes place at an end of the slow cycle 110 when the hydraulic clutch 22 is almost filled. The transmission control unit 27 calculates a clutch fill volume Qfill for adaptation at the second inflection event 128. A third inflection event 130 occurs at an end of the check cycle 112 where the hydraulic clutch 22 is completely filled with the hydraulic oil 33 at a fluid pressure Pfill according to the applied command pressure value Pcommand. As can be seen in FIG. 8, at the first inflection event 126, a brief period of acceleration in the output shaft or the turbine shaft is observed that are in excess of a calibration detection threshold. This is an indication that an applied pressure is sufficient to fill a cavity of the hydraulic clutch 22.

Referring to both FIG. 6 and FIG. 7, a first series of pressure pulses 132 that occur in the fast cycle 106 have decreasing fill durations sequentially. In contrast, a third series of pressure pulses 134 of the slow cycle 110 have shorter fill durations. In fact, fill durations of the first series 132 are substantially longer than fill durations of subsequent series 133, 134, 136. The fill durations reduce significantly in the fast-to-slow cycle 108 in a second series of pulses 133, as compared to the first series 133. The second series of pulses 133 is applied after detecting a speed variation of the output shaft of the hydraulic clutch 22 the first time. The third series of pulses 134 is applied in the slow cycle 134. A fourth series of pressure pulses 136 are applied after observing that the output shaft accelerates a second time. Durations of the third series of pressure pulses are almost constant throughout the check cycle 112.

Figure 9:
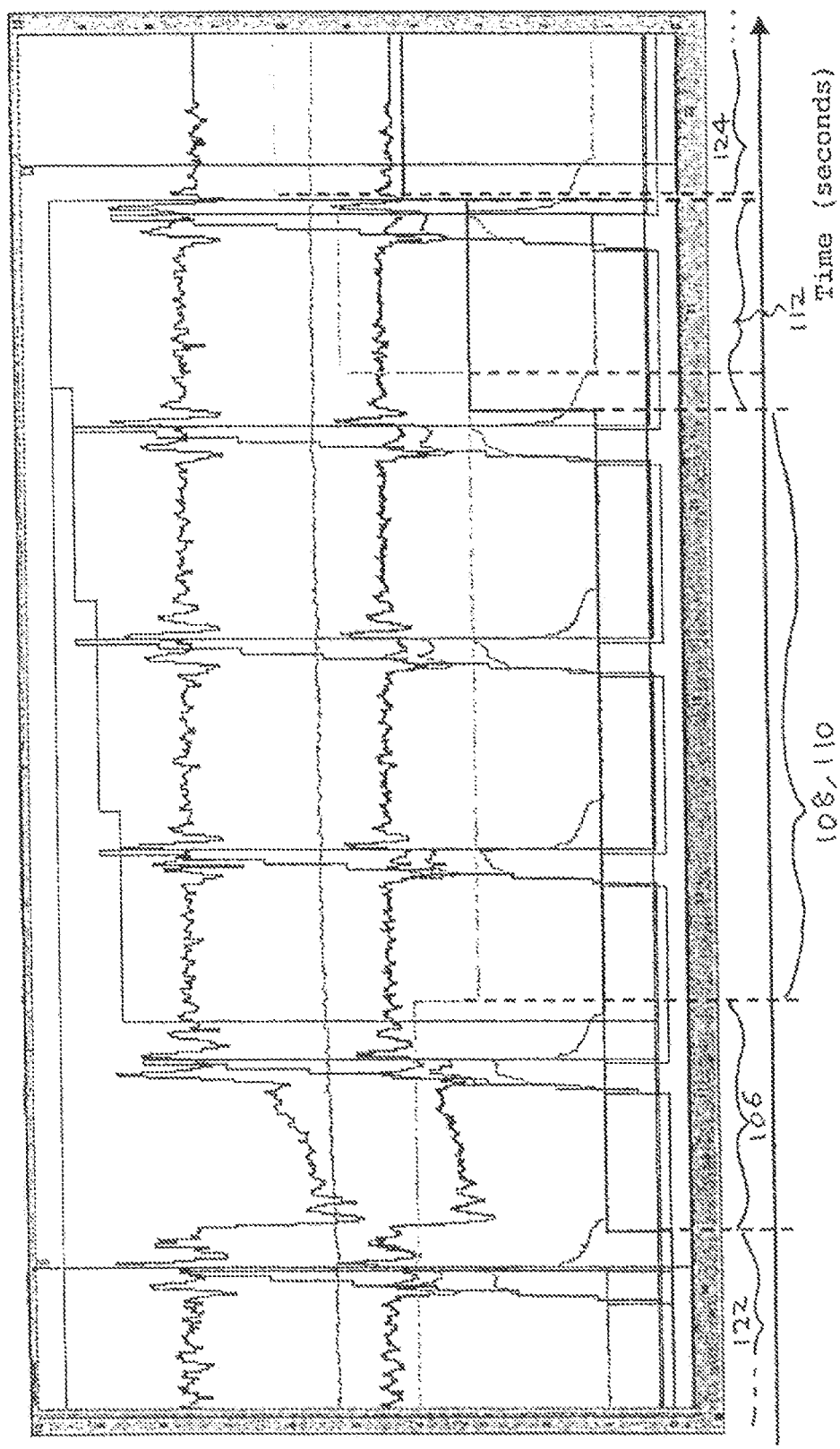
FIG. 9 illustrates plotted experimental data on volume learn algorithm action.

FIG. 9 illustrates plotted experimental data on volume learn pulse algorithm action, which corresponds to FIG. 8. The plotted curves are related to pressure fill cycles 122, 106, 108, 110, 112, 124. Among others, a line pressure, an essentially constant vehicle acceleration, pressure values at holding clutches and a tapped pulse pressure are shown.

The cycles 122, 124 are also referred as fill cycles, although they occur before and after the clutch filling. The curves of FIG. 9 show a situation in which a clutch capacity is not detected in a check cycle and a slow cycle is repeated After a slow cycle, the hydraulic oil fill capacity is not detected. After an adapted the hydraulic oil fill capacity is detected. At the end of the following check cycle 124, the hydraulic oil fill capacity is again detected.

Figure 10:
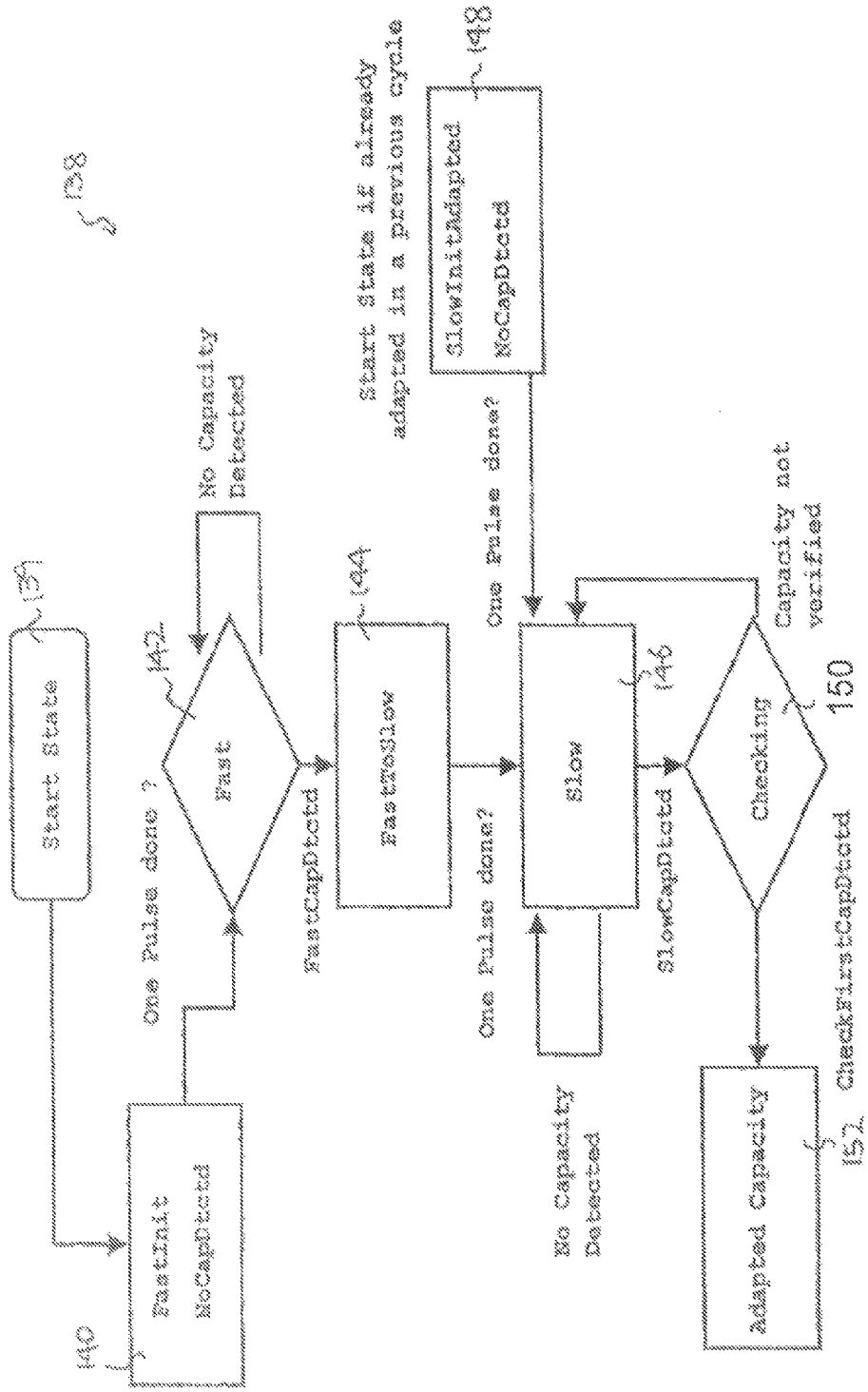
FIG. 10 illustrates a volume learn pulse algorithm strategy.

FIG. 10 illustrates a volume learn pulse algorithm strategy 138, which is a flow chart showing how the transmission control unit 27 executes the pressure learn pulse algorithm strategy 138. The transmission control unit 27 is reset at a start state 139. In the start state 139, the transmission control unit 27 does not detect any fill capacity because the hydraulic clutch 22 is still empty with no change of output speed on its output shaft. In a first step 140, the transmission control unit 27 is loaded with previously stored values of clutch fill volumes.

In a second step 142, which occurs in the fast cycle 106, the regulator valve 26 applies the first series of pulses 132 until the fill capacity is detected. The fill capacity is detected when the output shaft accelerates in its rotary speed as the first inflection event 126.

In a third step 144, the transmission control unit 27 moves to the fast-to-slow cycle 108. The fast-to-slow cycle 108 is a transition period between the fast cycle 106 and the slow cycle 110.

In a fourth step 146, the transmission control unit 27 arrives at the slow cycle 110. In the slow cycle 110, the transmission control unit 27 generates pressure pulses one by one at the regulator valve 26 if no clutch fill capacity is detected in a fifth step 148. However, the transmission control unit 27 causes the regulator valve 26 to move to a next sixth step 150 when the clutch fill capacity is detected at the second inflection event 128.

In the sixth step 150, the transmission control unit 27 moves to the check cycle 112 for verifying the clutch fill capacity. The verification is completed at the third inflection event 130 and the output shaft of the hydraulic clutch 22 reaches a higher rotation speed of another steady state.

As a result, the transmission control unit 27 has learnt another clutch fill volume in a seventh step 152, known as the clutch volume fill adaptation. Adapted clutch fill volume Vfill, clutch fill pressure ΔPfill and clutch fill command pressure value Pcommand are stored in the non-volatile memory.

Figure 11:
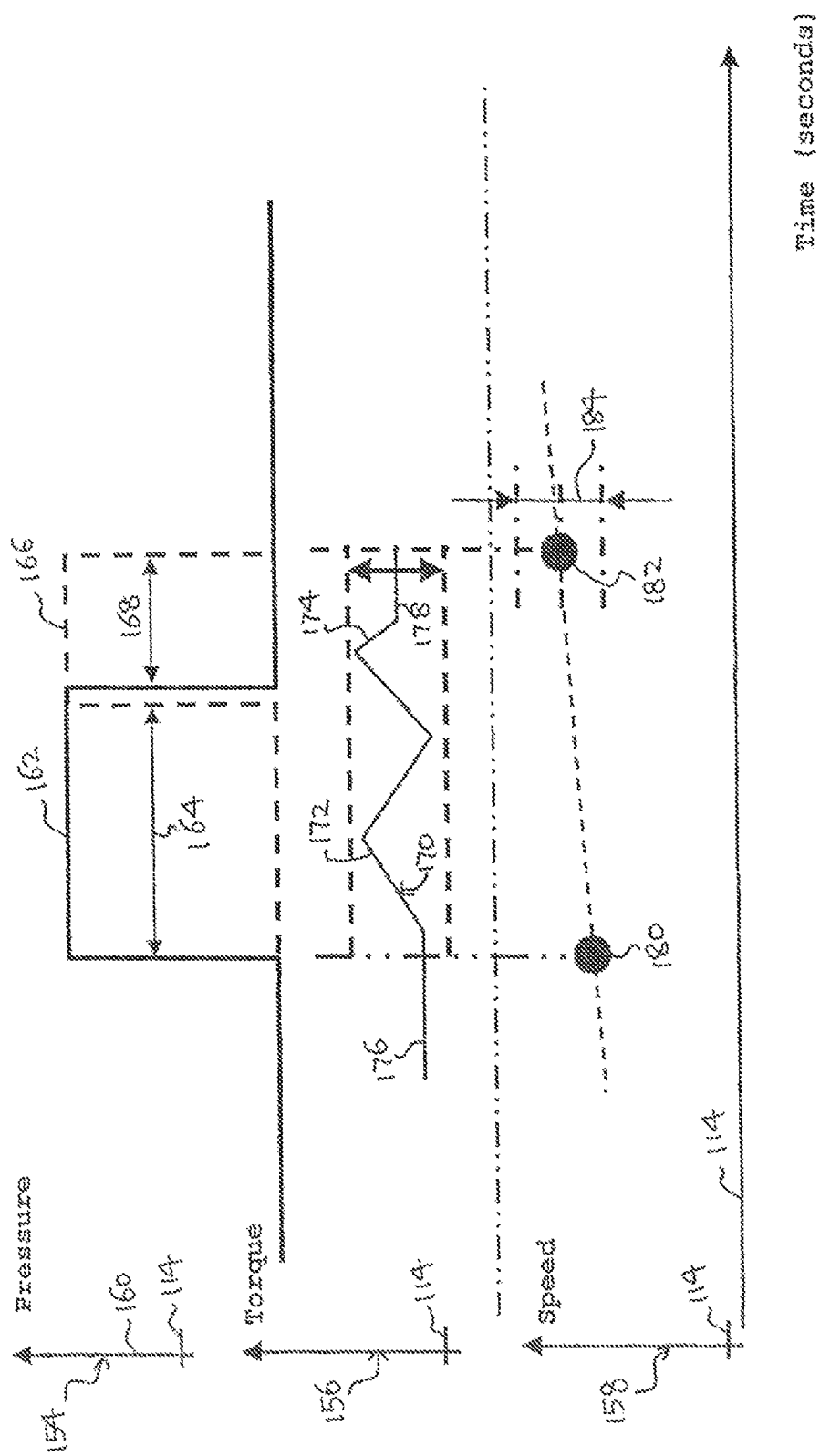
FIG. 11 illustrates conditions to declare a pulse valid capacity

FIG. 11 illustrates conditions to declare a pulse as a valid capacity, which are based on sensing the inflection events 126, 128, 130. FIG. 11 provides three charts 154, 156, 158 that share a horizontal axis 114. The horizontal axis 114 represents time duration in seconds. In a first chart 154, a first vertical axis 160 indicates Boolean on/off values of a pulse 162 and an observation window 166. A first pulse 162 of the hydraulic oil 33 which has a pulse length 164 has an associated observation window 166 which has a pulse length 168 for monitoring the inflection events 126, 128, 130. The beginning of the observation window 166 lies before the end of the pulse 162.

In a second chart 156, a torque curve or, respectively a throttle curve 170 shows an output torque of the hydraulic clutch 22 or, respectively an opening of a throttle. A second vertical axis 171 of the second chart 156 represents torque values of the torque curve 170. The torque curve 170 has a first peak value 172 and a second peak value 174. The torque trace 170 also shows a beginning torque value 176 before an acceleration event and an end torque value 178 after the acceleration event. According to a first monitoring method, the learning process is determined to be OK if the peak values 172 and 174 of the torque curve or respectively, the throttle curve 170 lie within a predetermined range, which is indicated by dotted horizontal lines.

In a third chart 158, there are two points 180, 182 that represent an initial output speed 180 and a predicted output speed 182 at the output shaft of the hydraulic clutch 22. According to a second monitoring method, the learning process is determined OK if an actual speed of the vehicle lies within a range 184 around the predicted output speed 182. If the actual speed does not lie within the range 184 it is an indication that the load on the vehicle has changed too much due to, for example, the road slope or brake pedal use and that the result of the learning process has to be discarded.

Figure 12:
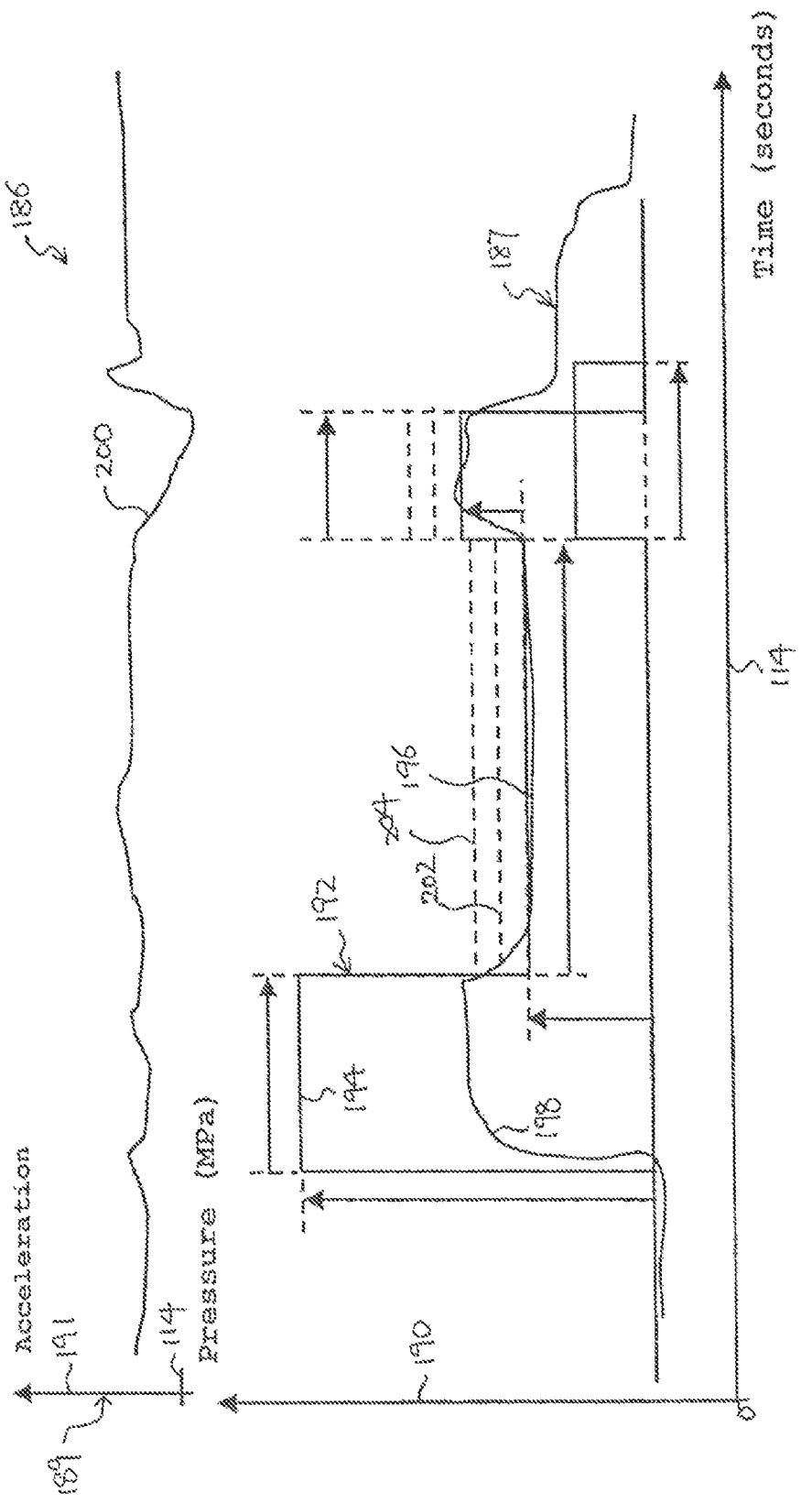
FIG. 12 illustrates a method of learning return spring pressure by multiple pulses of hydraulic oil injection.

FIG. 12 illustrates a method 186 of learning return spring pressure by multiple pulses of hydraulic oil injection. The method 186 is represented by two charts 187, 189. In a first chart 187, a horizontal axis 114 of the coordinate system denotes the time period characterized by the dimension in seconds. Further, a vertical axis 190 of the first chart 187 denotes a magnitude of clutch fill pressure. The second chart 189 has a vertical axis 191 which denotes accelerations of the output shaft of the hydraulic clutch 22.

As shown in FIG. 12, the regulator valve 26 injects the hydraulic oil 33 into the hydraulic clutch 22 according to a pressure profile 192. The hydraulic clutch 22 is lightly underfilled at a predetermined pressure 194 and then held at a pressure plateau 196 of a lower pressure. In the mean time, a test pulse pressure 198 is applied whose peak value is slightly higher than the pressure plateau 196, but lower than the predetermined pressure 194. When a fourth inflection event 200, such as the output shaft acceleration 116, as indicated by the solid line 198, is observed in excess of the calibration detection threshold, the pressure plateau 196 indicates the reactive pressure PRS of the valve spring 36. If an inflection is not observed, the method is repeated with successively higher pressure levels 202, 204 until an inflection event 200 is detected.

After the second fluid fill capacity detection point 115, the flow rate Qfill is computed 82 (see FIG. 4) based on the difference between the fluid pressure command Ppulse and a reactive pressure of the return spring 202 PRS (see also FIG. 4).

As also illustrated again in FIG. 8, there is further a fill time measurement. The fill time refers to the period, during which the applied pressure and its associated fill time are sufficient to fill the hydraulic clutch apply cavity, by the determination of the fluid pressure command Pcommand. The calculated flow rate Qfill and the measured fill time tP can be used to calculate a clutch fill volume Vclutch by, for example multiplying the flow rate Qfill with the fill time tP (see FIG. 4). The transmission control unit 27 uses the obtained values Vclutch and tP to operate the automatic transmission, which belongs to a powertrain of a vehicle. The automatic transmission includes the hydraulic clutch assembly 20.

Figure 13:
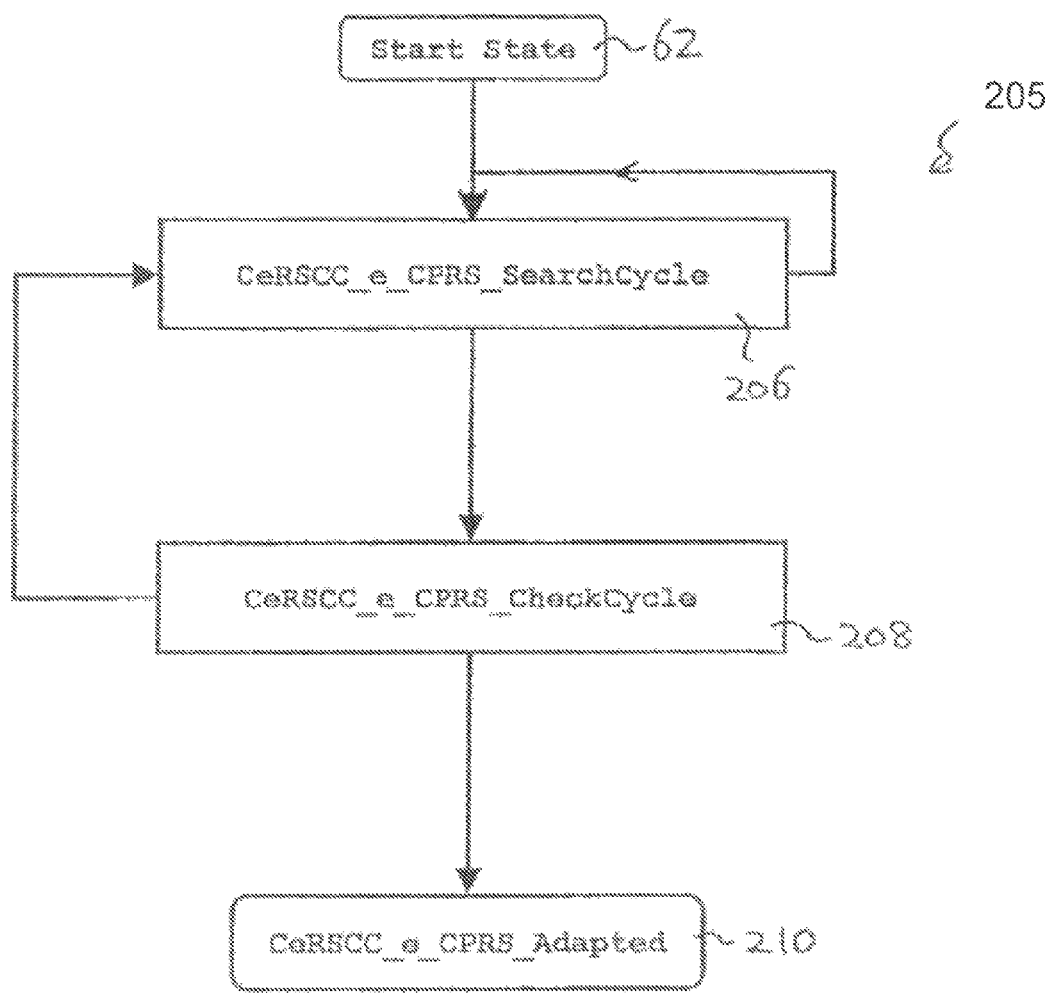
FIG. 13 a first flow chart on a method for adapting the return spring pressure of the regulator valve.

FIG. 13 illustrates a first flow chart showing a method 205 for adapting the return spring pressure PRS 202 of the regulator valve 26. The method 205 is also known as a return spring pressure adapt algorithm strategy. The method 205 begins with a first step 62 in which the steady state is the start state 62. In a second step 206, the transmission control unit 27 undergoes search cycles with regular intervals for checking whether the hydraulic clutch 22 is filled. The hydraulic clutch 22 is considered as filled if two continuous inflection events are detected. The state that the hydraulic clutch 22 is considered filled is alternatively known as fill capacity detected. After confirming the filling of the hydraulic clutch 22, the transmission control unit 27 proceeds to the check cycle 112, which is a third step 208 of the method 205. The fill capacity is verified only if the third inflection event 130 is found. In a fourth step 210, the return spring pressure PRS is considered to be adapted by the transmission control unit 27 on detecting the third inflection event 130.

Figure 14:
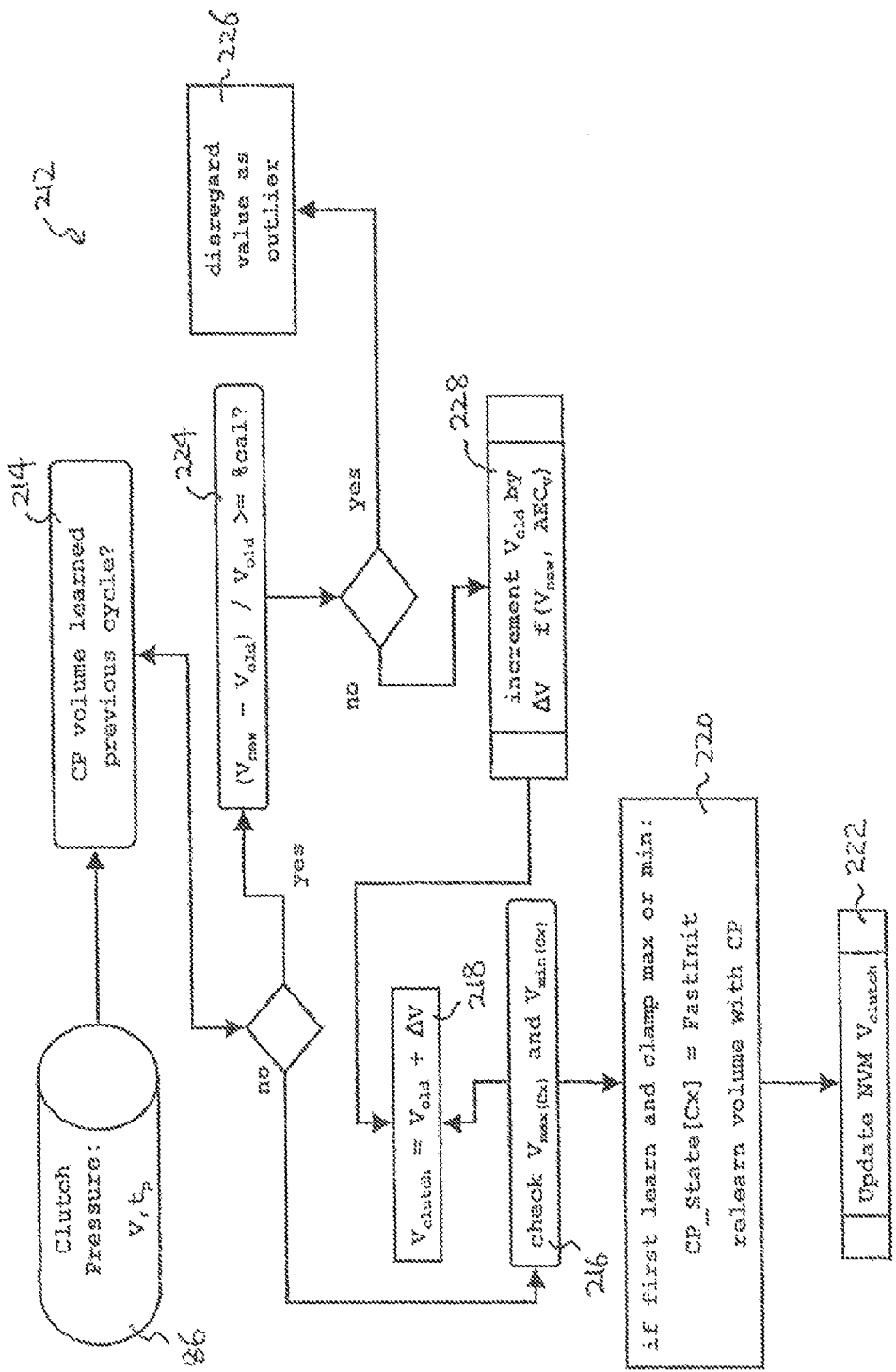
FIG. 14 illustrates a clutch volume adaptation based on fill pulse timemethod.

FIG. 14 illustrates a method 212 of a clutch volume adaptation based on fill pulse time algorithm. The method 212 begins by obtaining clutch fill pressure values V and tP of a previously learned cycle in a first step 214. If there is no previously learned fill pressure values V and tP, the transmission control unit 27 obtains the maximum clutch fill volume Vmax(Cx) and the minimum clutch fill volume Vmin(Cx) from the non-volatile memory in a second step 216. The transmission control unit 27 adapts the clutch fill volume by using either the maximum clutch fill volume Vmax(Cx) or the minimum clutch fill volume Vmin(Cx) for the fast initiation cycle. The selected clutch fill volume is taken as a preceding value Vold in a fourth step 218. By following through the subsequent fast cycle 106, the fast-to-slow cycle 108, the slow cycle 110, and the check cycle 112, the transmission control unit 27 learns the adapted clutch fill volume Vclutch (i.e., Vfill or V) in a fourth step 220. The adapted values of V and tP are stored in the non-volatile memory in a last step 222.

However, in the method of FIG. 14, if the transmission control unit 27 finds the clutch fill volume values V and tP from a previously learned cycle, the transmission control unit 27 proceeds to follow through the subsequent cycles 106, 108, 110, 112, 124 for finding a new clutch fill volume Vnew. The transmission control unit 27 calculates a relative change of the clutch fill volume Vclutch in a fifth step 224 by taking a ratio of a difference between the new clutch fill volume Vnew and the preceding clutch fill volume Vold over the preceding clutch fill volume Vold. If the change in terms of percentage value is greater than a predetermined value, the new clutch fill volume Vnew is disregarded as an outliner in a sixth step 226. If the change is less than the predetermined value, an adapted clutch fill volume Vclutch will be calculated by providing an increment $\Delta V$ to the preceding clutch fill volume Vold in a seventh step 228. The increment $\Delta V$ is computed based on the new clutch fill volume Vnew and on an adaptive error counter AECv for the fill volume. The adaptive error counter range from a minimum to a maximum value, for example from −7 to +7, wherein a positive value indicates that the adaptive value has been increasing and a negative value indicates that the adaptive value has been decreasing.

In the method 212 of clutch fill volume adaptation, shift specific adaptive volumes that are learned based on ratio change event detection will be replaced by one volume learned for each clutch.

Figure 15:
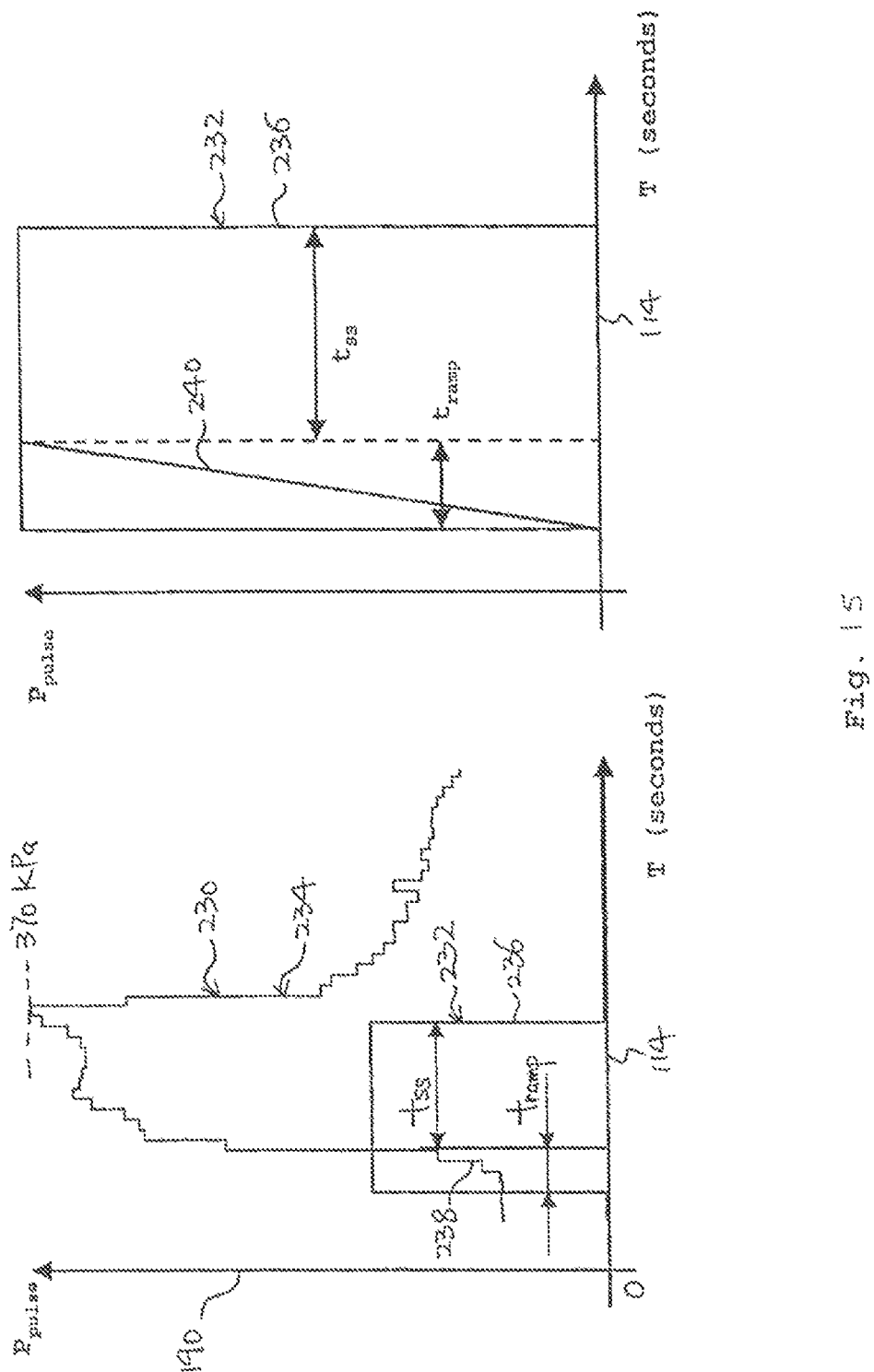
FIG. 15 illustrates clutch volume versus fill pulse conversion.

FIG. 15 illustrates a relation between an applied pressure pulse Pcommand and a corresponding clutch pressure Ppulse. The pressure Pcommand. FIG. 15 includes a first chart 230 and a second chart 232. The first chart 230 shows that the clutch pressure Ppulse shows a filling delay as compared to the pulse pressure. The second chart 232 illustrates a method for computing a ramp time tramp for compensating the filling delay.

The first chart 230 has a horizontal axis 114 for indicating time T in seconds and a vertical axis 119 for indicating fluid pressure Ppulse in kPa. There are two lines 234, 236 in the first chart 230. A first line 234 represents fluid pressure of injected pressure pulse Ppulse when the regulator valve 26 is open for injecting the hydraulic oil 33 into the hydraulic clutch 22. The first line 234 includes a portion 238 that shows a pressure ramp up period tramp in the hydraulic clutch 22. A second line 236 provides an intended pressure pulse profile of the transmission control unit 27.

There are also two lines 236, 240 in the second chart 232. The portion 238 of the first chart 230 is replaced by a straight line 240 in the second chart 232. A breadth of the straight line 240 in a horizontal direction indicates the time taken for building up pressure inside the hydraulic clutch 22, which is known as tramp. The duration that the hydraulic clutch 22 is kept at the targeted Pcommand is labelled as period of steady state tss.

The conversion from clutch fill volume Qfill to clutch fill volume Vfill is achieved through a series of calculations. Firstly, $\Delta$Pfill is obtained by the method of second iteration 90 as in FIG. 5 based on the input value of Pcommand (i.e., Ppulse). The $\Delta$Pfill is alternatively known as $\Delta$Porifice. The method 90 further provides the clutch fill volume Qfill.

Accordingly, an adapted clutch fill volume Vclutch (i.e., Vfill) is obtained by following an equation of $$V_{clutch} = Q_{fill}\left(\frac{t_{ramp}}{2} + t_{ss}\right).$$

The required fill rate Q_fill, which is multiplied by the corrected pulse time t_ramp+t_ss to obtain the clutch fill volume, is obtained from a look up table based on the filling pressure and on the temperature of the hydraulic fluid.

Figure 16:
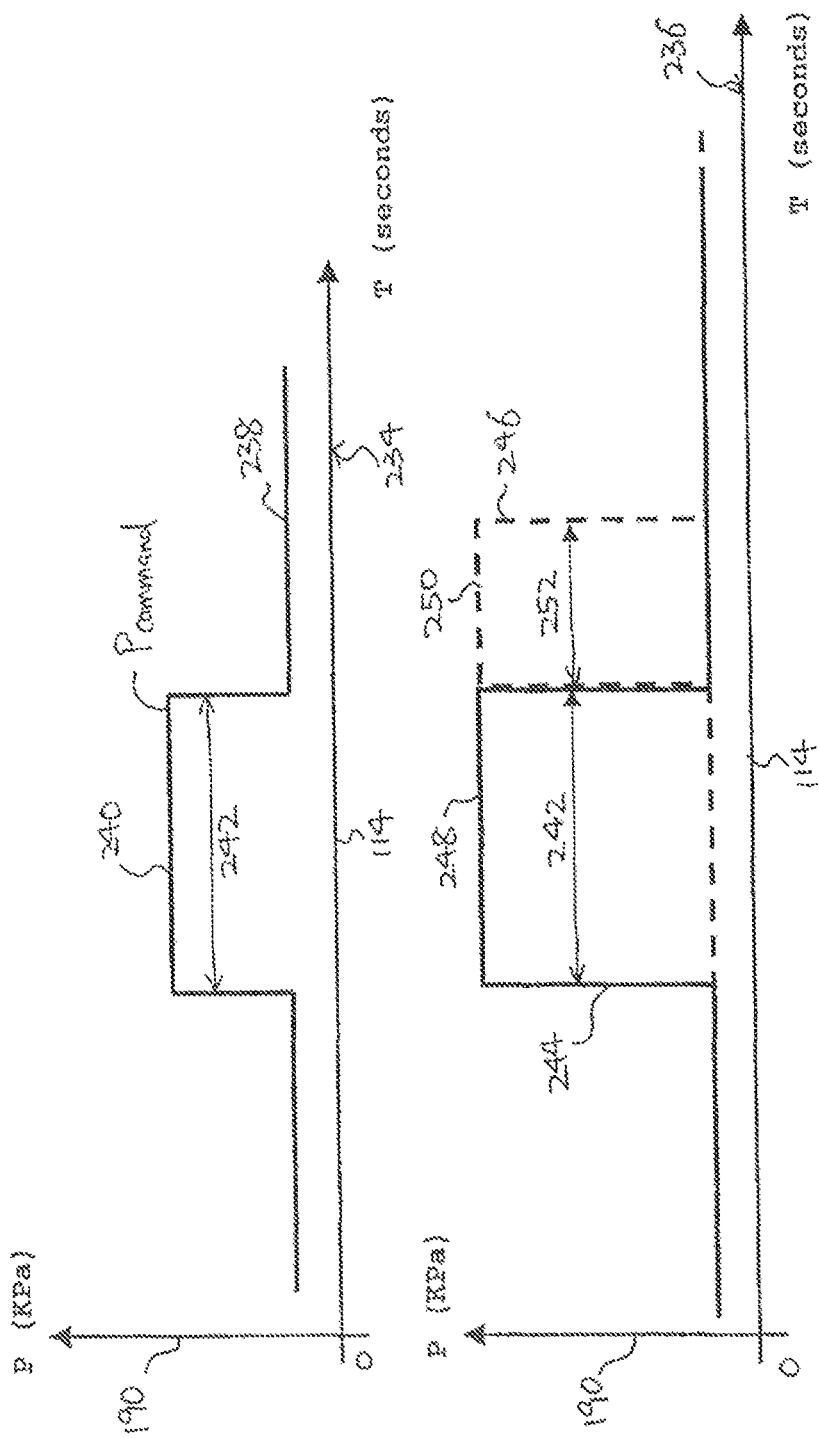
FIG. 16 illustrates adaptive pulse overfill protection.

FIG. 16 illustrates adaptive pulse overfill protection mechanism. FIG. 16 presents two charts 234, 236 that are aligned vertically. The first chart 234 has a horizontal axis T 114 extending laterally, and characterised by seconds as its measurement units. The first chart 234 also has a vertical axis P 190 extending vertically, and characterised by kPa as its measurement units. The first chart 234 depicts a pressure curve 238 in a square form, which has a pulse active window 240. The pulse active window 240 shows duration 242 and magnitude of a fluid fill pressure Pcommand for injecting fluid into the hydraulic clutch 22.

The second chart 236 also has a horizontal axis T 114 extending laterally. A vertical axis 190 of the second chart 236 indicates an observed pressure P in kPa, which corresponds to the Pcommand. The second chart 236 has two square curves 244, 246 that are a detection curve 244 and an observation curve 246 respectively. The detection curve 244 occurs concurrently with the pressure curve 238 under the control of transmission control unit 27 such that a detection window 248 is synchronised with the pulse active window 240.

The observation curve 246 follows immediately after the detection curve 244 and it has an observation window 250. During the observation window 250, the transmission control unit 27 observes inflection events 126, 128, 130 of the automatic transmission for protecting the hydraulic clutch 22 from overfill. A duration 252 of the observation window 250 is shorter that that of the detection window 248. If an excessive long pulse time is applied to the regulator valve 26 for filling the hydraulic clutch 22, the automatic transmission will be found tie-up before the observation window 250. The tie-up event is also realized in the observation window 250.

While at least one exemplary embodiment has been presented in the foregoing summary and detailed description, it should be appreciated that a vast number of variations exist. It should also be appreciated that the exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made to the functions and arrangement of elements described in an exemplary embodiment without departing from the scope as set forth in the appended claims and their legal equivalents.

What is claimed is:
1. A method for learning a characteristic filling volume of a hydraulic clutch, the method comprising:
   applying a pressure pulse to the hydraulic clutch when the hydraulic clutch is in a disengaged state;
   determining, with a control unit, an inflection event at a torque path that comprises the hydraulic clutch, wherein the determining the inflection event comprises detecting whether the hydraulic clutch changes from the disengaged state to an at least partially engaged state; and
   deriving, with the control unit, the characteristic filling volume of the hydraulic clutch from the inflection event.

2. The method according to claim 1, wherein the torque path comprises at least one other clutch, the at least one other clutch being engaged.

3. The method according to claim 1, further comprising:
applying a fast cycle series of pressure pulses until the inflection event is detected, the fast cycle series of pressure pulses comprises pulses with increasing pulse length.

4. The method according to claim 3, wherein applying at least one pressure pulse of the fast cycle series of pressure pulses comprises:
applying a slow cycle series of pressure pulses until the inflection event is detected, the slow cycle series of pressure pulses comprising pulses with increasing a pulse length, and
wherein a pulse length increment of the slow cycle series of pressure pulses is smaller than the pulse length increment of the fast cycle series of pressure pulses.

5. The method according to claim 4, wherein applying the at least one pressure pulse of the fast cycle series of pressure pulses comprises:
applying a test series of pressure pulses, the test series of pressure pulses having essentially equal lengths and the pulse length essentially equal to a length of a last pulse of the slow cycle series of pressure pulses.

6. The method according to claim 2, further comprising:
deriving a return spring pressure from a pressure level of a second pulse;
and if the inflection event is not detected in the determining:
increasing the pressure level of a second pressure pulse;
increasing the pressure level of a third pressure pulse;
applying the second pulse with the pressure level of the second pulse; and
applying a third pulse with the pressure level of the third pulse.

7. The method according to claim 6, wherein the width of the second pressure pulse is greater than the width of the pressure pulse and the width of the second pressure pulse is greater than the width of the third pressure pulse.

8. A method for learning a characteristic return spring pressure of a hydraulic clutch, the method comprising:
applying a first pressure pulse to the hydraulic clutch when the hydraulic clutch is in a disengaged state;
applying a second pressure pulse to the hydraulic clutch when the hydraulic clutch is in the disengaged state, a pressure level of the second pressure pulse smaller than the pressure level of the first pressure pulse;
applying a third pressure pulse to the hydraulic clutch when the hydraulic clutch is in the disengaged state, the pressure level of the third pressure pulse smaller than the pressure level of the first pressure pulse and greater than the pressure level of the second pressure pulse;
determining, with a control unit, an inflection event at a torque path that comprises the hydraulic clutch while applying the third pressure pulse;
deriving, with the control unit, the characteristic return spring pressure of the hydraulic clutch from the inflection event.

9. The method according to claim 8, wherein the determining the inflection event comprises detecting whether the hydraulic clutch changes from the disengaged state to an at least partially engaged state.

10. The method according to claim 8, wherein the torque path comprises at least one other clutch, the at least one other clutch being engaged.

11. The method according to claim 8, further comprising applying a fast cycle series of pressure pulses until the inflection event is detected, the fast cycle series of pressure pulses comprises pulses with increasing pulse length.

12. The method according to claim 11, wherein applying at least one pressure pulse comprises:
applying a slow cycle series of pressure pulses until the inflection event is detected, the slow cycle series of pressure pulses comprising pulses with increasing a pulse length, and
wherein a pulse length increment of the slow cycle series of pressure pulses is smaller than the pulse length increment of the fast cycle series of pressure pulses.

13. The method according to claim 12, wherein applying the at least one pressure pulse comprises:
applying a test series of pressure pulses, the test series of pressure pulses having essentially equal lengths and the pulse length essentially equal to a length of a last pulse of the slow cycle series of pressure pulses.

14. The method according to claim 9, further comprising:
deriving a return spring pressure from a pressure level of a second pulse if an inflection event is detected in the determining;
if the inflection event is not detected in the determining:
increasing the pressure level of a second pressure pulse;
increasing the pressure level of a third pressure pulse;
applying the second pulse with the pressure level of the second pulse; and
applying a third pulse with the pressure level of the third pulse.

15. The method according to claim 14, wherein the width of the second pressure pulse is greater than the width of a pressure pulse and the width of the second pressure pulse is greater than the width of the third pressure pulse.

16. A method for engaging a hydraulic clutch comprising:
reading in a characteristic clutch volume of the hydraulic clutch from a memory;
reading in a characteristic return spring pressure of the hydraulic clutch from the memory;
deriving, with a control unit, a filling pressure from the characteristic clutch volume, a pulse length and a return spring pressure;
deriving, with the control unit, a command pressure from the filling pressure; and
applying the command pressure to a servo valve of the hydraulic clutch for engaging the hydraulic clutch.

17. A hydraulic clutch assembly, comprising:
a hydraulic clutch;
a filling pipeline connected to the hydraulic clutch;
a clutch fill regulator valve in the filling pipeline and dividing the filling pipeline into an upstream pipeline configured to receive a hydraulic fluid with a line pressure and into a downstream pipeline configured to connect the clutch fill regulator valve to the hydraulic clutch; and
a control unit, comprising:
an output port configured to provide an output control signal to the clutch fill regulator valve of the hydraulic clutch, and
an input port configured to receive an input signal from an inflection event sensor in a torque path that comprises the hydraulic clutch; and
a processor configured to determine a characteristic filling volume from the output control signal and from the input signal and configured to store the characteristic filling volume, wherein the processor is further configured to applying a pressure pulse to the hydraulic clutch when the hydraulic clutch is in a disengaged state;

determining an inflection event at a torque path that comprises the hydraulic clutch, wherein the determining the inflection event comprises detecting whether the hydraulic clutch changes from the disengaged state to an at least partially engaged state; and deriving the characteristic filling volume of the hydraulic clutch from the inflection event.

18. The hydraulic clutch assembly according to claim 17, wherein the downstream pipeline further comprises a downstream orifice configured to act with the clutch fill regulator valve to apply a clutch fill pressure to the hydraulic clutch.

19. The hydraulic clutch assembly of claim 18, wherein the downstream orifice is configured to divide the downstream pipeline into a regulator downstream pipeline and a clutch downstream pipeline such that a first end of the clutch fill regulator valve is connected to the regulator downstream pipeline via a P valve pipeline .

* * * * *